(12) United States Patent
Roessle et al.

(10) Patent No.: US 12,460,694 B2
(45) Date of Patent: Nov. 4, 2025

(54) HYDRAULIC DAMPER HAVING A PRESSURE TUBE AND A RING

(71) Applicant: DRIV AUTOMOTIVE INC., Skokie, IL (US)

(72) Inventors: Matthew Lawrence Roessle, Temperance, MI (US); Thomas Mallin, Temperance, MI (US); Christopher Serement, Trenton, MI (US)

(73) Assignee: Advanced Suspension Technology LLC, Northville, MI (US)

( * ) Notice: Subject to any disclaimer, the term of this patent is extended or adjusted under 35 U.S.C. 154(b) by 504 days.

(21) Appl. No.: 17/880,208

(22) Filed: Aug. 3, 2022

(65) Prior Publication Data

US 2024/0044392 A1 Feb. 8, 2024

(51) Int. Cl.
*F16F 9/58* (2006.01)
*F16F 9/18* (2006.01)
*F16F 9/34* (2006.01)

(52) U.S. Cl.
CPC .............. *F16F 9/585* (2013.01); *F16F 9/185* (2013.01); *F16F 9/34* (2013.01); *F16F 2222/12* (2013.01); *F16F 2230/007* (2013.01); *F16F 2230/36* (2013.01)

(58) Field of Classification Search
CPC .... F16F 9/585; F16F 9/185; F16F 9/34; F16F 2230/007; F16F 2222/12; F16F 2230/36; F16F 9/49; F16F 9/36
See application file for complete search history.

(56) References Cited

U.S. PATENT DOCUMENTS

| | | | |
|---|---|---|---|
| 3,920,253 A | 11/1975 | Bauer | |
| 6,003,848 A | 12/1999 | Cotter et al. | |
| 9,593,697 B2 | 3/2017 | Baalmann et al. | |
| 9,835,220 B2 | 12/2017 | Kontny et al. | |
| 10,371,226 B2 | 8/2019 | Bruno et al. | |
| 10,989,268 B2 | 4/2021 | Oliveira et al. | |
| 11,892,056 B2 * | 2/2024 | Roessle | F16F 9/3405 |
| 12,025,205 B2 * | 7/2024 | Roessle | F16F 9/3235 |
| 2006/0219507 A1 | 10/2006 | Drott et al. | |
| 2007/0246892 A1 | 10/2007 | Andersson et al. | |
| 2014/0360353 A1 | 12/2014 | Baalmann et al. | |
| 2015/0090548 A1 | 4/2015 | Yamanaka | |

(Continued)

FOREIGN PATENT DOCUMENTS

| | | |
|---|---|---|
| CN | 101782127 A | 3/2013 |
| DE | 102014203598 A1 | 8/2015 |

(Continued)

OTHER PUBLICATIONS

German Patent No. DE 102008042103 to Hammer published on Mar. 25, 2010.*

(Continued)

*Primary Examiner* — Pamela Rodriguez
(74) *Attorney, Agent, or Firm* — McGarry Bair PC

(57) ABSTRACT

A ring circumscribing a moveable rod of a hydraulic damper. The movable rod defining an axis. The ring comprising a first wall, a second wall, an inner wall, an outer wall and a fluid passage. The fluid passage comprising a first channel extending radially along the second wall from the inner wall, with respect to the axis The fluid passage further comprising a second channel.

20 Claims, 16 Drawing Sheets

(56) References Cited

U.S. PATENT DOCUMENTS

| | | | |
|---|---|---|---|
| 2015/0369367 A1 | 12/2015 | Kuroki | |
| 2016/0091046 A1 | 3/2016 | Soromenho | |
| 2017/0009840 A1 | 1/2017 | Hertz | |
| 2019/0154104 A1 | 5/2019 | Kontny et al. | |
| 2022/0341481 A1* | 10/2022 | Roessle | F16F 9/3242 |

FOREIGN PATENT DOCUMENTS

| | | |
|---|---|---|
| DE | 102015223581 A1 | 6/2017 |
| DE | 102016207324 A1 | 11/2017 |
| JP | 2011214639 A | 10/2011 |
| JP | S526937 B1 | 6/2019 |
| WO | 2016146660 A1 | 9/2016 |
| WO | 2018103982 A1 | 6/2018 |

OTHER PUBLICATIONS

Chinese Patent No. CN 105927691 to Courtney et al published on Nov. 14, 2017.*

Notice of Transmittal of the International Search Report and the Written Opinion of the International Searching Authority for PCT/US2020/041500, 14 Pages, Dated Oct. 20, 2020.

* cited by examiner

HYDRAULIC DAMPER HAVING A PRESSURE TUBE AND A RING

TECHNICAL FIELD

The disclosure generally relates to a hydraulic damper, specifically a hydraulic damper of a steering assembly.

BACKGROUND

A hydraulic damper, and particularly a hydraulic damper of a steering assembly, is a damping mechanism that is used to stabilize or otherwise minimize an uncontrolled oscillation of the steering assembly. The hydraulic damper can include a tube defining a reservoir containing at least a hydraulic fluid, an oscillating member or rod extending through at least portion of the reservoir, and a valve fluidly coupled to the reservoir. The valve can define a hydraulic fluid channel that can act as an inlet for the hydraulic fluid within the reservoir. The oscillating member, at one end, can be operably coupled to an oscillating, moving, or otherwise non-static portion of the steering assembly (e.g., a lever arm coupled to a wheel). The movement of the non-static portion that the oscillating rod is coupled to can cause the movement of the oscillating rod through the reservoir. This, in turn, can direct the hydraulic fluid through valving provided within the hydraulic damper, thus creating a damping effect on the non-static portion of the steering assembly.

For reasons relating to comfort, the damping force of the damper cannot be increased beyond a certain threshold as it may cause an axle of the vehicle and the damper to move into a rebound limit at high speeds. A hydraulic rebound end stop is typically provided to reduce the speed at which the damper moves into the rebound limit. Current hydraulic rebound end stop designs utilize a ring, such as a brass ring, with a controlled gap. When such rings enter a hydraulic rebound stop zone towards an end of the rebound stroke, a high damping force is created that causes dissipation of kinetic energy and helps in reduction of noise. Under certain conditions when the ring is outside the hydraulic rebound stop zone or in a transition zone, high velocity of oil flowing around the ring forces the ring to plastically deform and open up. Such unlocking of the ring may cause the ring to fail and may in turn affect hydraulic rebound end stop function of the damper and binding in the damper.

BRIEF DESCRIPTION

In one aspect, a ring circumscribing a moveable rod of a hydraulic damper, the moveable rod defining an axis, the ring comprising a first wall, a second wall, axially spaced from the first wall, with respect to the axis, an inner wall extending circumferentially about the axis and confronting the moveable rod and extending between the first wall and the second wall, an outer wall extending circumferentially about the axis, the outer wall circumscribing the inner wall and extending between the first wall and the second wall, and a fluid passage comprising a first channel extending radially along the second wall and from the inner wall, with respect to the axis and a second channel at least partially overlapping a portion of the first channel and extending axially along a portion of the outer wall and from the second wall, with respect to the axis.

In another aspect, a hydraulic damper comprising a pressure tube including an inner portion defining an interior, a moveable rod at least partially received within the interior and defining an axis, and a ring circumscribing the moveable rod, the ring comprising a first wall, a second wall, radially spaced from the first wall, with respect to the axis, an inner wall extending circumferentially about the axis and confronting the moveable rod and extending between the first wall and the second wall, an outer wall extending circumferentially about the axis, the outer wall circumscribing the inner wall and extending between the first wall and the second wall, and a fluid passage comprising a first channel extending radially along the second wall and axially into the inner wall and the outer wall, with respect to the axis, and a second channel at least partially overlapping a portion of the first channel and extending axially along a portion of the outer wall and radially into the second wall, with respect to the axis

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
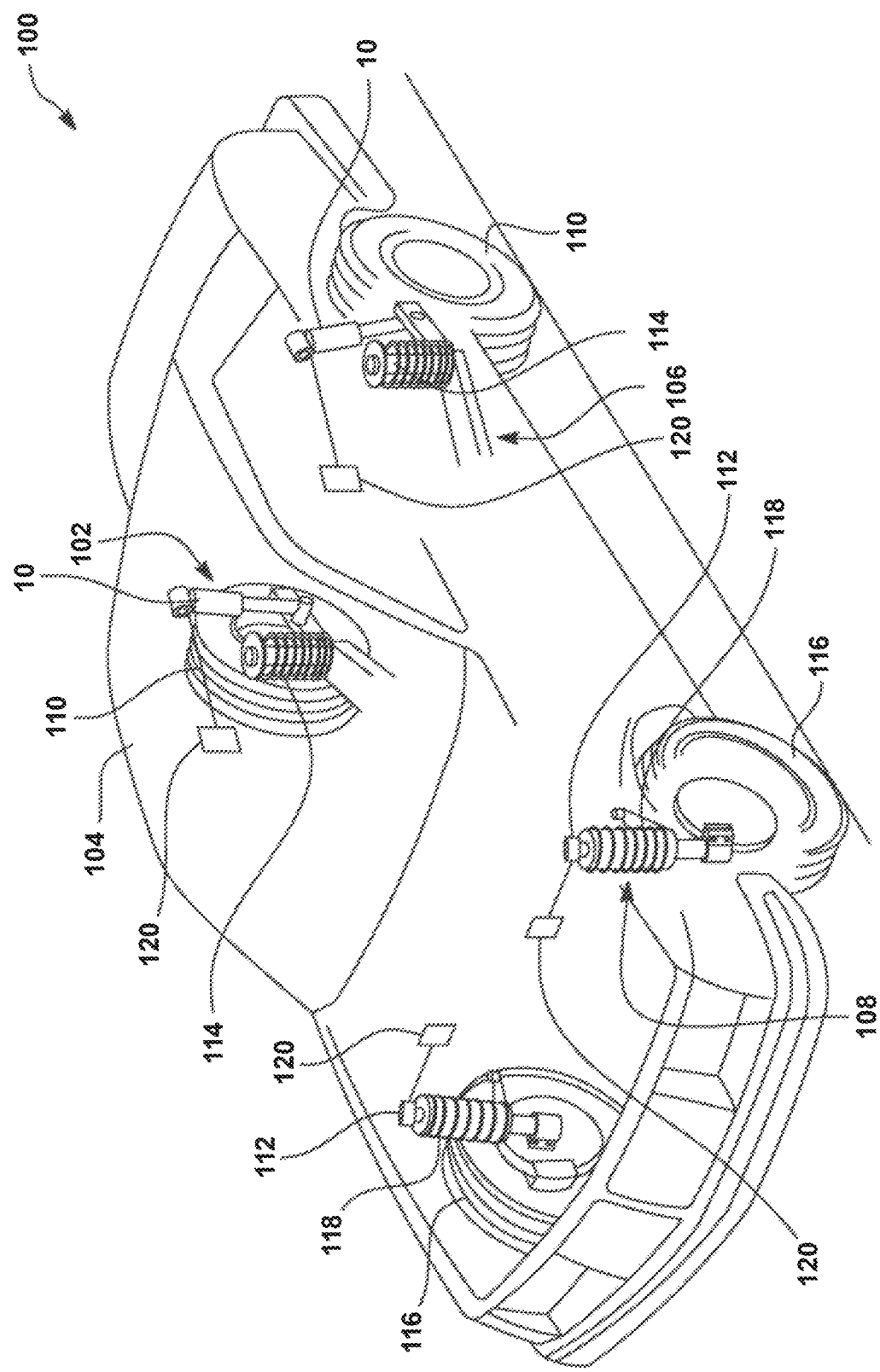
FIG. 1 is an illustration of a vehicle including a suspension system, according to an aspect of the present disclosure.

Aspects of this disclosure described herein are broadly directed to a hydraulic damper including an outer tube, an inner tube or a pressure tube, and a sealing assembly provided within the pressure tube. The sealing assembly includes a first collar, a second collar, and a ring provided therebetween. The sealing assembly can divide the pressure tube between a high-pressure region and a low-pressure region. The ring extends circumferentially between a first end and a second end and includes a lock at least partially defining the first end and the second end. A first channel and a second channel can be formed within a portion of the ring and be used to allow or otherwise control a hydraulic fluid between the high-pressure region and the low-pressure region. The ring can be used to limit, control, retard, or otherwise stop the uncontrolled ingress of hydraulic fluid between the high-pressure region and the low-pressure region. The hydraulic damper can be utilized within any suitable damping mechanism. As a non-limiting example, the hydraulic damper can be utilized within a steering assembly for a vehicle. It will be understood, however, that aspects of the disclosure described herein are not so limited and can have general applicability within other assemblies including a hydraulic damper. For example, the disclosure can have applicability for hydraulic damper in other vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is an illustration of a vehicle 100 including a suspension system 102 in accordance with the present disclosure. The vehicle 100 can be any suitable vehicle 100. As a non-limiting example, the vehicle 100 can include a vehicle driven by an internal combustion engine, an electric vehicle, or a hybrid vehicle. The vehicle 100 includes a body 104. While the vehicle 100 has been depicted as a passenger car, the hydraulic dampers 10 can be used with other types of vehicles or any equipment that requires damping. Examples of vehicles include buses, trucks, off-road vehicles, and so forth. Furthermore, the term "damper" as used herein will refer to dampers in general and will include shock absorbers, MacPherson struts, and semi-active and active suspensions. The suspension system 102 of the vehicle 100 includes a rear suspension 106 and a front suspension 108.

The rear suspension 106 includes a transversely extending rear axle assembly (not shown) adapted to operatively support a pair of rear wheels 110. The rear axle assembly is operatively connected to the body 104 through a pair of hydraulic dampers 10 and a pair of helical coil springs 114. Similarly, the front suspension 108 includes a transversely extending front axle assembly (not shown) which operatively supports a pair of front wheels 116. The front axle assembly is operatively connected to the body 104 through another pair of the hydraulic dampers 10 and a pair of helical coil springs 118. As a non-limiting example, the vehicle 100 can include an independent suspension unit (not shown) for each of the four corners instead of front and rear axle assemblies.

The hydraulic dampers 10 of the suspension system 102 serve to damp relative movement of the unsprung portion (i.e., the front and rear suspensions 108, 106) and the sprung portion (i.e., the body 104) of the vehicle 100.

In order to automatically adjust each of the hydraulic dampers 10, an electronic controller 120 is electrically connected to the hydraulic dampers 10. The controller 120 is used for controlling an operation of each of the hydraulic dampers 10 in order to provide appropriate damping characteristics resulting from movements of the body 104 of the vehicle 100. Further, the controller 120 can independently control each of the hydraulic dampers 10 in order to independently regulate a damping level of each of the hydraulic dampers 10. The controller 120 can be electrically connected to the hydraulic dampers 10 via wired connections, wireless connections, or a combination thereof. In examples, each of the hydraulic dampers 10 can include a dedicated electronic controller that can be located onboard the respective hydraulic damper 10. Further, the functionalities of the controller 120 can be performed by an Electronic Control Unit (ECU) of the vehicle 100.

The controller 120 can independently adjust the damping level or characteristic of each of the hydraulic dampers 10 to optimize a riding performance of the vehicle 100. The term "damping level", as used herein, refers to a damping force produced by each of the hydraulic dampers 10 to counteract movements or vibrations of the body 104. A higher damping level can correspond to a higher damping force. Similarly, a lower damping level can correspond to a lower damping force. Such adjustments of the damping levels can be beneficial during braking and turning of the vehicle 100. The controller 120 can include a processor, a memory, Input/Output (I/O) interfaces, communication interfaces, and other components. The processor can execute various instructions stored in the memory for carrying out various operations of the controller 120. The controller 120 can receive and transmit signals and data through the I/O interfaces and the communication interfaces. Further, the controller 120 can include microcontrollers, application-specific integrated circuits (ASICs), field programmable gate arrays (FPGAs), and so forth.

Figure 2:
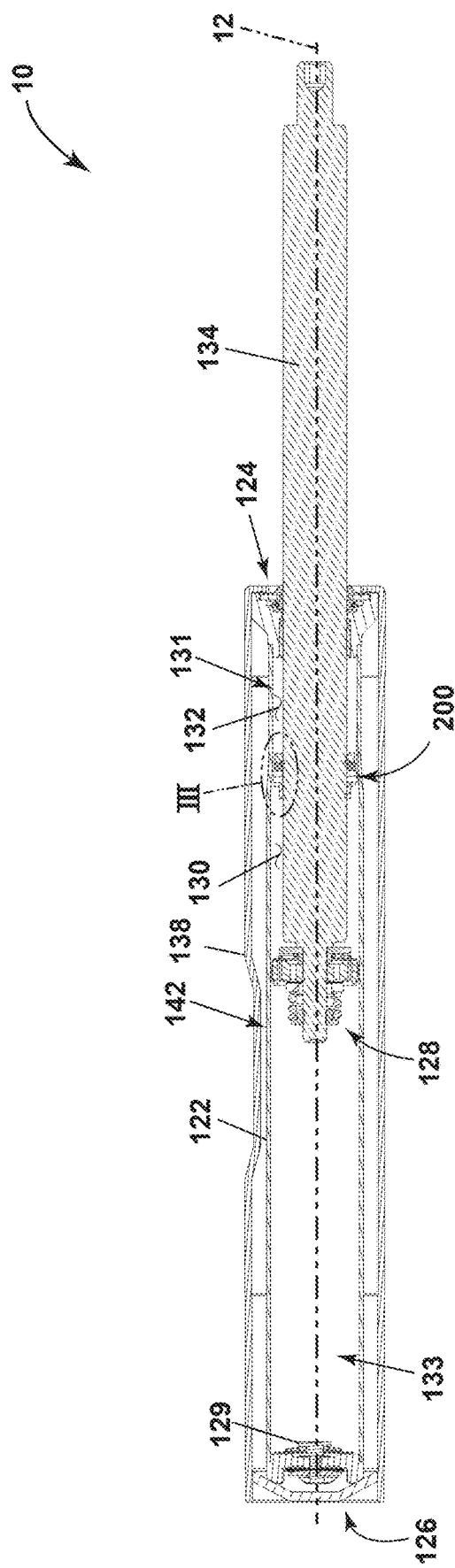
FIG. 2 is a cross-sectional view of a hydraulic damper for use within the suspension system of FIG. 1, the hydraulic damper including a sealing assembly and a movable rod.

FIG. 2 illustrates a cross-sectional view of the hydraulic damper 10. The hydraulic damper 10 can be any suitable hydraulic damper 10 for a vehicle 100. As a non-limiting example, the hydraulic damper 10 can include a Continuously Variable Semi-Active Suspension system (CVSA) damper or a shock absorber. As illustrated, the hydraulic damper 10 is a double-tube damper. Alternatively, the hydraulic damper 10 can include a mono-tube damper. The hydraulic damper 10 can contain a fluid which can be a hydraulic fluid or oil. The hydraulic damper 10 includes an outer tube 138 and an inner tube or pressure tube 122 defining a first end 124 and a second end 126 opposite to the first end 124. The pressure tube 122 can be formed as a monolithic pressure tube. The pressure tube 122 can be further formed as a substantially cylindrical tube with open ends.

A movable rod (e.g., a piston 128) can be slidably disposed within the pressure tube 122. The piston 128 can define a rebound chamber within the pressure tube 122. The first rebound chamber 130 is proximal to the first end 124, while the hydraulic rebound end stop chamber 131 is distal to the first end 124. The piston 128 can define a axis 12 of the hydraulic damper 10. Each of the first and second rebound chambers 130, 132 contains the fluid therein. A volume of each of the first and second rebound chambers 130, 132 varies based on a reciprocating motion of the piston 128. Additionally, a pair of piston valves (not shown) can be disposed within the piston 128 to regulate fluid flow between the first and second rebound chambers 130, 132. More particularly, the piston valves can maintain desired pressures in each of the first and second rebound chambers 130, 132.

The piston 128 can be connected to the body 104 of the vehicle 100 by a piston rod 134. The piston rod 134 is coupled to the piston 128. The piston rod 134 is adapted to reciprocate with the piston 128. Further, the piston rod 134 is partially received within the pressure tube 122. The piston rod 134 extends through the first end 124 of the pressure tube 122.

The hydraulic damper 10 can include a base valve 129. The base valve 129 can be disposed proximal to the second end 126 of the pressure tube 122. The base valve 129 can allow fluid flow between the compression chamber 133 and a reserve chamber 142. Further, at least one of the piston valves and the base valve can be electronically controlled by the controller 120 (shown in FIG. 1) such that the controller 120 can regulate the piston valves and the base valve in order to control the damping level of the hydraulic damper 10.

A hydraulic rebound end stop system 200 or sealing assembly can be provided within a portion of the pressure tube 122. As a non-limiting example, the hydraulic rebound end stop system 200 can be provided within the rebound chamber 131. The hydraulic rebound end stop system 200 splits the rebound chamber 131 into two different chambers; a first rebound chamber 130 and a second rebound chamber 132. The hydraulic rebound end stop system 200 can at least partially seal, limit, or otherwise retard a flow of fluid between the first rebound chamber 130 and the second rebound chamber 132.

The hydraulic damper 10 also includes the outer tube 138 or outer tube 138 disposed around the pressure tube 122. In some examples, the outer tube 138 is concentrically disposed around the pressure tube 122. The outer tube 138 can define the reserve chamber 142. As a non-limiting example, the reserve chamber 142 can be disposed between the pressure tube 122 and the outer tube 138. The reserve chamber 142 can be in fluid communication with an external fluid reservoir (not shown). As a non-limiting example, the reserve chamber 142 can be in fluid communication with an accumulator. Further, the hydraulic damper 10 can include a valve assembly (not shown) that provides fluid communication between the reserve chamber 142 and the external fluid reservoir. In such examples, the valve assembly can regulate a flow of fluid between the reserve chamber 142 and the external fluid reservoir. The valve assembly can be electronically controlled by the controller 120.

Figure 3:
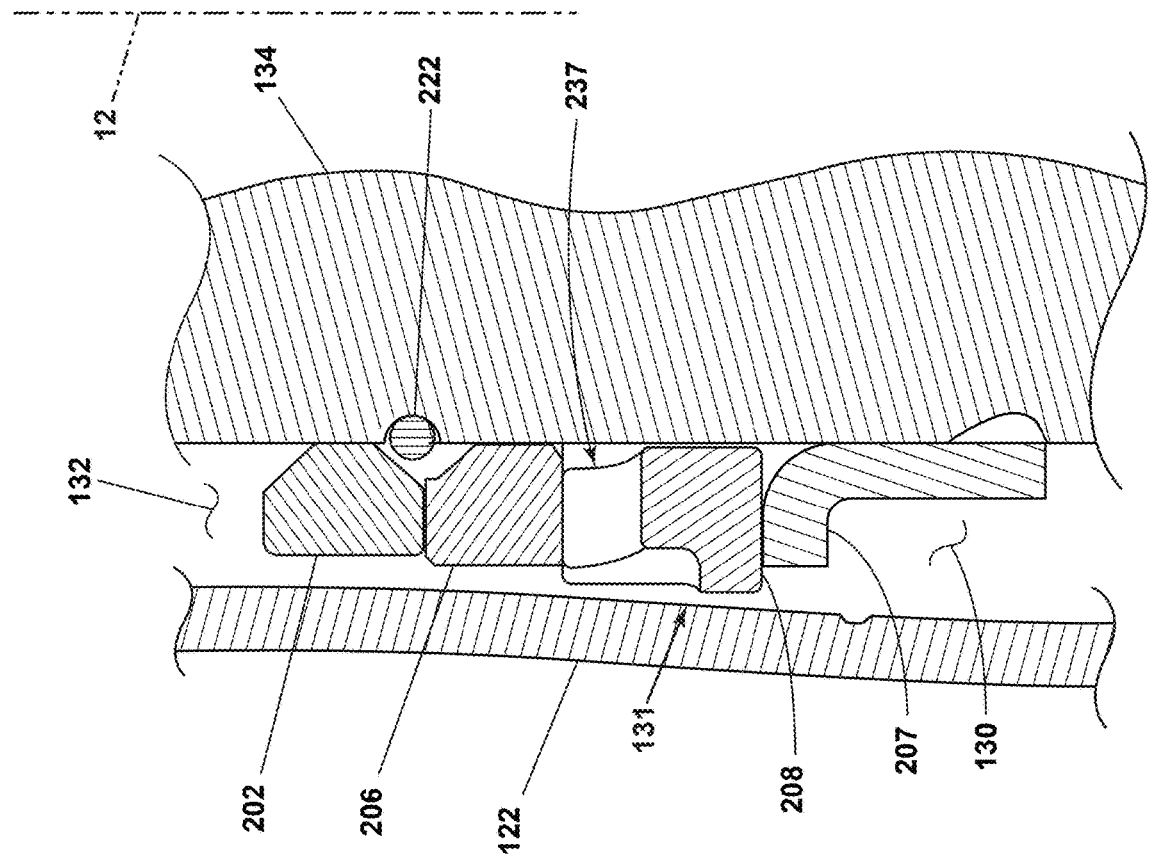
FIG. 3 is an enlarged, cross-sectional view of the sealing assembly as seen from portion III of FIG. 2, further illustrating a first collar, a second collar, and a ring disposed therebetween.

FIG. 3 is an enlarged, cross-sectional view of the hydraulic rebound end stop system 200 as seen from portion III of the hydraulic damper 10 of FIG. 2. The hydraulic rebound end stop system 200 can be disposed proximal to the first end 124 of the hydraulic damper 10.

The hydraulic rebound end stop system 200 can include a rebound bumper 202, a first collar 206, a ring 208, and a second collar 207. The hydraulic damper 10 includes the rebound bumper 202. The rebound bumper 202 can embody an annular member made from plastic, a polymer, an elastic material, or a metal which defines a through bore (not shown) through which the piston rod 134 extends. The rebound bumper 202 can be received within a portion of the first rebound chamber 130. The rebound bumper 202 surrounds the piston rod 134. As a non-limiting example, the rebound bumper 202 can be disposed around the piston rod 134 by a snap fit arrangement. In some examples, the rebound bumper 202 can be compressed when the piston 128 moves towards the first end 124 during the rebound stroke or when the piston 128 is in a full rebound condition against the rebound bumper 202.

The first collar 206 is disposed around the piston rod 134 and adjacent to the rebound bumper 202. The first collar 206 can be formed as an annular ring disposed around the piston rod 134 that defines a through opening (not shown) to receive the piston rod 134 therethrough. The first collar 206 can be made of a plastic, a polymer, or a metal. As a non-limiting example, the first collar 206 is slidable along an axis 12 defined by the hydraulic damper 10. Moreover, the hydraulic damper 10 can include the second collar 207 that is disposed around the piston rod 134 and axially spaced apart from the first collar 206. The second collar 207 includes a substantially L-shaped cross-section and a through opening (not shown) to receive the piston rod 134 therethrough. The second collar 207 contacts the ring 208. The second collar can be crimped for connecting the second collar 207 to the piston rod 134. As such, the second collar 207 can be fixedly coupled to the piston rod 134 and does not slide along the axis 12. The second collar 207 can be made of a plastic, a polymer, or a metal.

Figure 4:
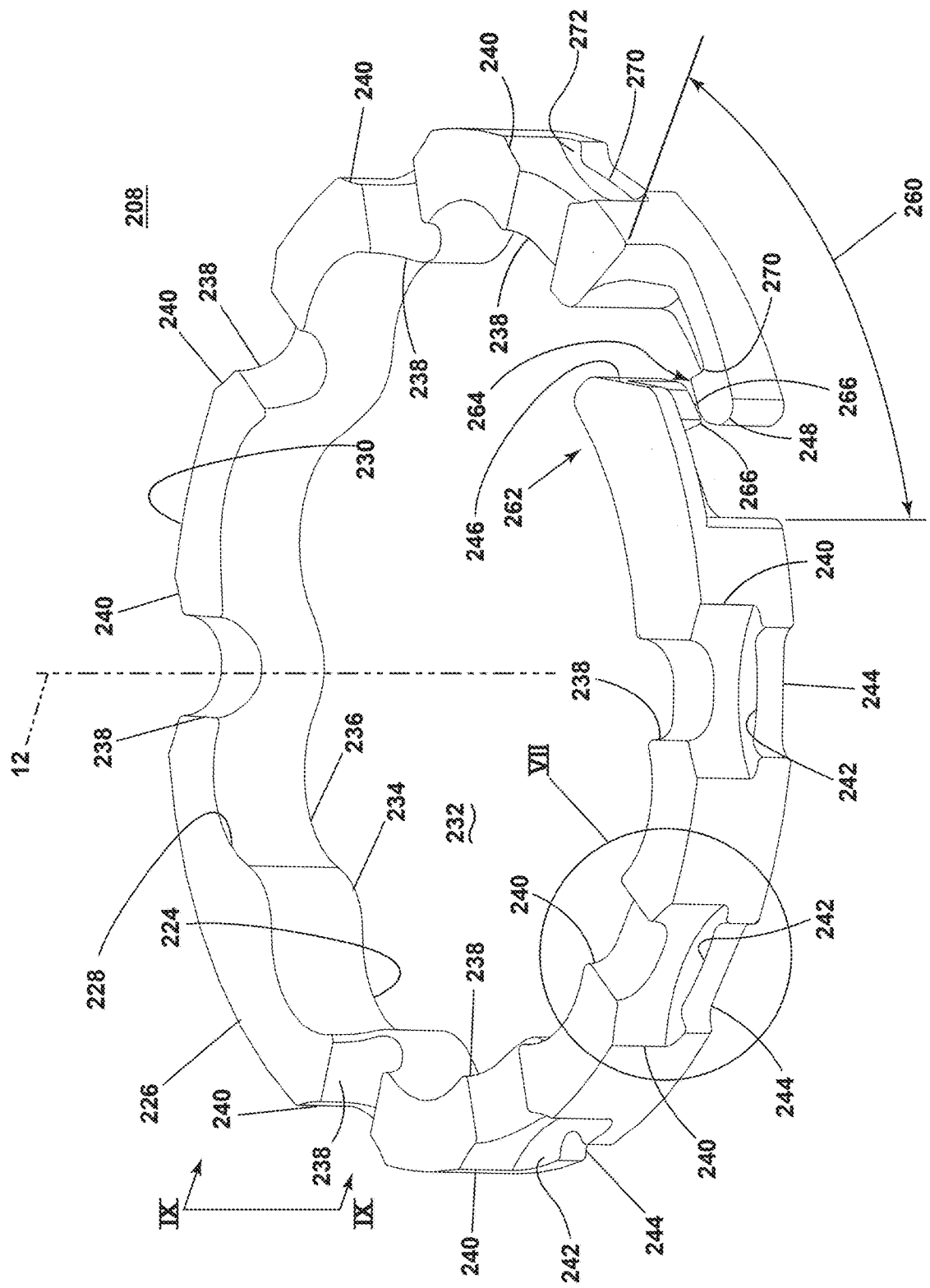
FIG. 4 is a perspective view of the ring of FIG. 3, further illustrating a lock in a disengaged position and a fluid passage having at least a first channel and a second channel formed along the ring.

FIG. 4 is a perspective view of the ring 208 of FIG. 3. The ring 208 can extend circumferentially between a first end 246 and a second end 248. As illustrated, the ring 208 can be provided in a first, disengaged position such that the first end 246 is spaced from the second end 248 and a gap, or absence of material is formed between the first end 246 and the second end 248.

The ring 208 can be defined by a first wall 224, a second wall 226, an inner wall 228 and an outer wall 230. As the first end 246 is disengaged from the second end 248, the first wall 224, the second wall 226, the inner wall 228, and the outer wall 230 are non-continuously formed about the peripheries of the ring 208. As illustrated, the ring 208 is formed as a donut, such that a middle of the ring 208 is hollow. As such, the inner wall 228 and the outer wall 230 can each define a circumferential of the wall (e.g., an inner circumference and outer circumference, respectively), such that the inner wall 228 can be yet further defined as a first circumferential surface, and the outer wall 230 can be defined as a second circumferential surface circumscribing the inner wall 228.

The interior of the ring 208 (e.g., the portion of the ring 208 confronting the inner wall 228) can be defined a through opening 232 in which a portion of the hydraulic damper 10 can extend through. As a non-limiting example, at least a portion of the piston rod 134 can extend through the opening 232. When assembled, the hydraulic damper 10, the inner wall 228 faces or otherwise confronts the piston rod 134.

The inner wall 228, as illustrated, can include a non-constant radius with respect to the axis 12. As a non-limiting example, the inner wall 228 can include an undulating surface. The inner wall 228 includes a plurality of concave surfaces 234 and a plurality of convex surfaces 236. Each of the plurality of concave surfaces 234 can be provided adjacent to the corresponding convex surface 236 of the plurality of convex surfaces 236. As a non-limiting example, the inner wall 228 includes six concave surfaces 234 and six convex surfaces 236. The inner wall 228 includes alternating concave and convex surfaces 234, 236. Each concave surface 234 is curved away from the piston rod 134. Therefore, when assembled, a space is defined between each concave surface 234 and the piston rod 134. Further, each convex surface 236 is curved towards the piston rod 134 such that at least a portion of the convex surfaces 236 confront the piston rod 134.

A plurality of fluid passages 237 are formed along the ring 208. Each fluid passage 237 includes at least a first channel 238 and a second channel 240. At least a portion of the fluid passages 237 further include a notch 244. The second channel 240 of each fluid passage 237 overlays or overlaps the first channel 238. The second channel 240 of each fluid passage 237 overlaps and overlays the notch 244 if the fluid passage 237 includes the notch 244.

The first set of channels 238 can be formed within a portion of the second wall 226 and extend into the ring 208. As illustrated, the first set of channels 238 can extend radially through the second wall 226 and axially into at least the inner wall 228, with respect to the axis 12. The first set of channels 238 can be formed as any suitable shape. As a non-limiting example, the first set of channels 238 can be formed as U-shaped channels.

The second set of channels 240 can be formed within a portion of the outer wall 230. The second set of channels extend radially into a respective portion of the second wall 226, with respect to the axis 12. Each channel of the second set of channels 240 can at least partially overlay or circumferentially span a respective channel of the first set of channels 238. Each channel of the second set of channels 240 extends axially from the second wall 226, with respect to the axis 12. Each channel of the second set of channels 238 terminates at a distal end 242, which is axially spaced form the first wall 224, with respect to the axis 12.

The notch 244 is formed along the ring 208. The at least one notch 244 can correspond to and be fluidly coupled to at least one channel of the second set of channels 240. The at least one notch 244 can extend axially, with respect to the axis 12, from the first wall 224 and to the distal end 242 of a respective channel of the second set of channels 240.

The ring 208 can further include a lock 260 including the first end 246 and the second end 248 of the ring 208. The lock 260 can include a first finger 262 and a second finger 264. As a non-limiting example, the first finger 262 and the second finger 264 can be formed as mirror images when viewed along respective planes extending along the axis 12 and intersecting the first finger 262 and the second finger 264. The first finger 262 can include a first latch 266 or hook extending from the remainder of the first finger 262. The second finger can include a second latch 268 or hook extending from the remainder of the second finger 264.

Figure 5:
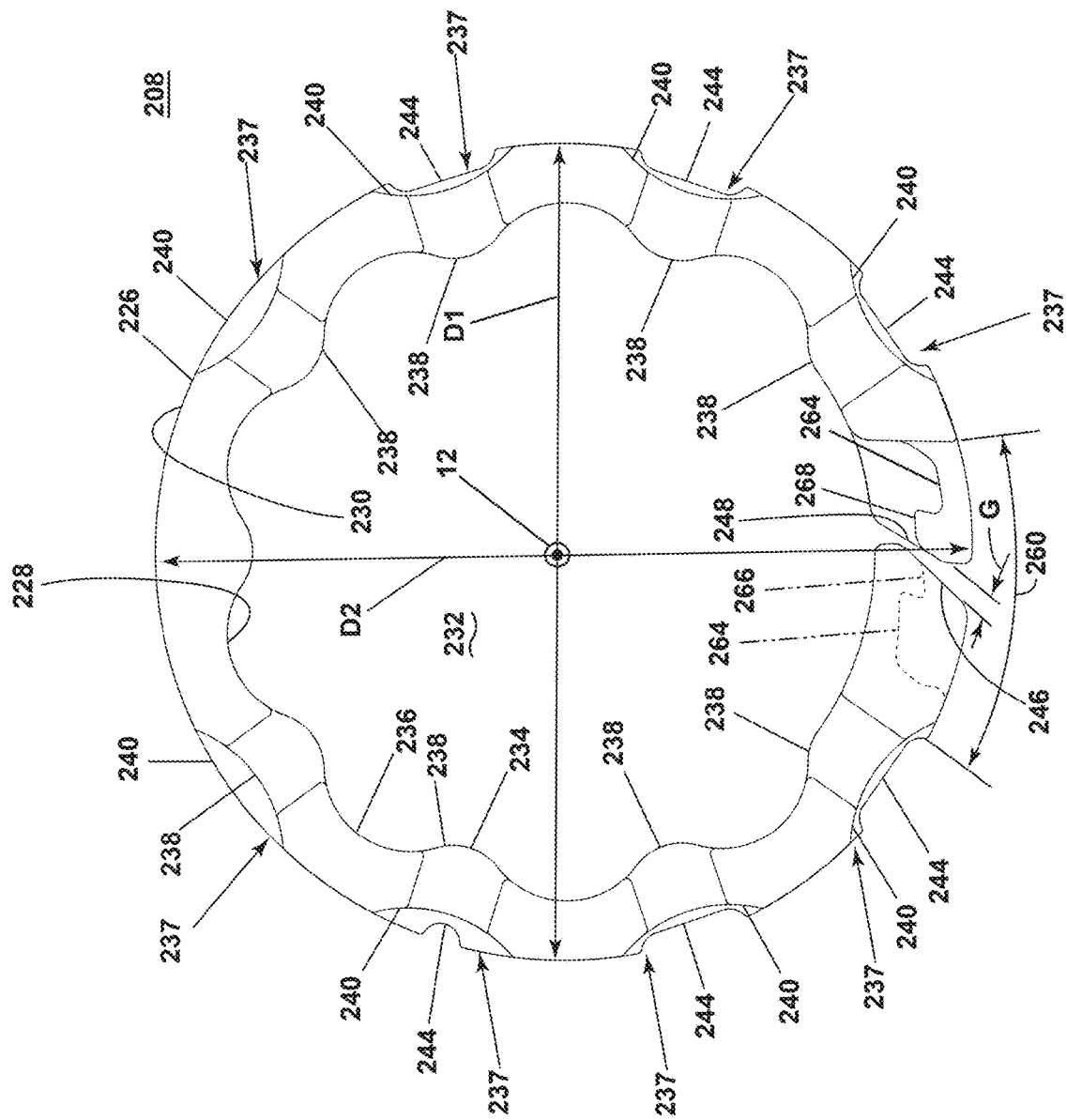
FIG. 5 is a top view of the ring of FIG. 4, further illustrating a gap formed within the lock when in the disengaged portion.

FIG. 5 is a top view of the ring 208 of FIG. 4, further illustrating a set of dimensions of the ring 208 when in the first, disengaged position.

The ring 208 can be defined by a first diameter D1 and a second diameter D2. The first diameter D1 can be measured between opposing portions of the outer wall 230 that are 90 degrees from the first end 246 or the second end 248. The second diameter D2 can be measured between a portion of the outer wall 230 including the first end 246 and an opposite end of the outer wall 230 (e.g., a portion of the outer wall 230 180 degrees away). When in the first, disengaged position, the first diameter D1 can be larger than the second diameter D2. As such, the ring 208 can be formed as an oval, rather than a circle.

The ring 208 can further be defined by the gap formed between the first end 246 and the second end 248. The gap can span a circumferential distance G between the first end 246 and the second end 248, with respect to the axis 12, and define an absence of material. The distance G can be any suitable distance such as, but not limited to, between 1.0 and 1.5 mm. The difference between the first diameter D1 and the second diameter D2 can be a direct by-product of the gap. In other words, the second diameter D2 is smaller than the first diameter D1 because the gap is formed when the ring 208 is in the first, disengaged position.

Figure 6:
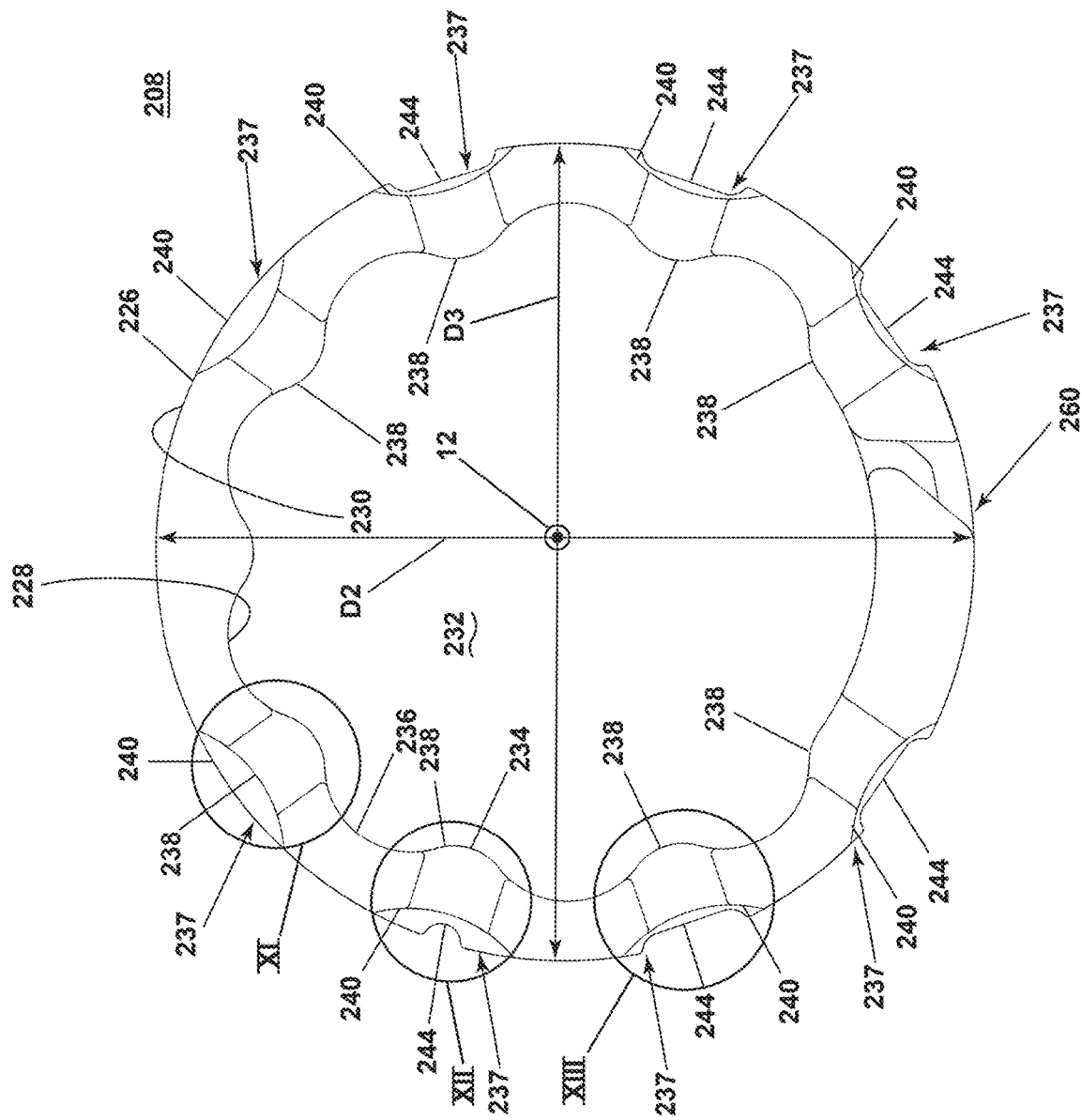
FIG. 6 is a top view of the ring of FIG. 4, with the lock being in a second, engaged position.

FIG. 6 is a top view of the ring 208 of FIG. 3 in a second, engage position. As used herein, the term "engaged position" or iterations thereof, can refer to a positioning of the ring where at least a portion of the first finger 262 confronts at least a portion of the second finger 264. When in the engaged position, the first end 246 can extend circumferentially past the second end 248. As a non-limiting example, when in the engaged position, the first latch 266 can engage at least a portion of the second latch 268. As a non-limiting example, in the engaged position, the gap defined by the distance G is no longer formed.

When in the engaged position, the ring 208 is defined by the second diameter D2 and a third diameter D3. The third diameter D3, similar to the first diameter D1, can be measured between opposing portions of the outer wall 230 that are each 90 degrees from where the first end 246 meets the outer wall 230. As a non-limiting example, the third dimeter D3 can be smaller than the first diameter D1 such that the third diameter D3 can be equal to the second diameter D2. As such, the ring 208 can be formed as a circle.

The first, disengaged position can be further be defined as a non-assembled state of the ring 208, while the second, engaged position can be defined as an assembled state of the ring 208. The ring 208 can be assembled by compressing the ring 208 such that the gap is closed and the first diameter D1 is reduced to the third diameter D3, and the first latch 266 hooks over, overlaps, or otherwise confronts an opposing portion of the second latch 268. When the ring 208, however, is compressed together, a stress is formed within a circumferentially opposite end of the ring 208 with respect to the first end 246 and the second end 248. It is contemplated that the larger the gap, the larger the first diameter D1. The larger the first diameter D1, the larger the total distance required to compress the ring 208 into the assembled state. In other words, the larger the distance the ring 208 needs to be compressed for the first latch 266 to engage the second latch 268, the larger the overall stress will be. As such, it is beneficial to minimize the distance G of the gap. The smaller the distance G of the gap, the smaller the stress will. This will ultimately result in a longer lifespan of the ring 208. However, the size of the gap is limited to manufacturing tolerances. As such, the distance G of gap can be defined as the smallest distance possible between the first end 246 and the second end 248 given manufacturing tolerances.

While illustrated as the lock 260 having the first finger 262 and the second finger 264 that engage one another, it will be appreciated that the lock 260 can be any suitable lock 260 configured to limit a circumferential movement of the ring 208 when in an engaged position. As a non-limiting example, the lock 260 can be a latch, a magnet, a clip, or the like.

Figure 7:
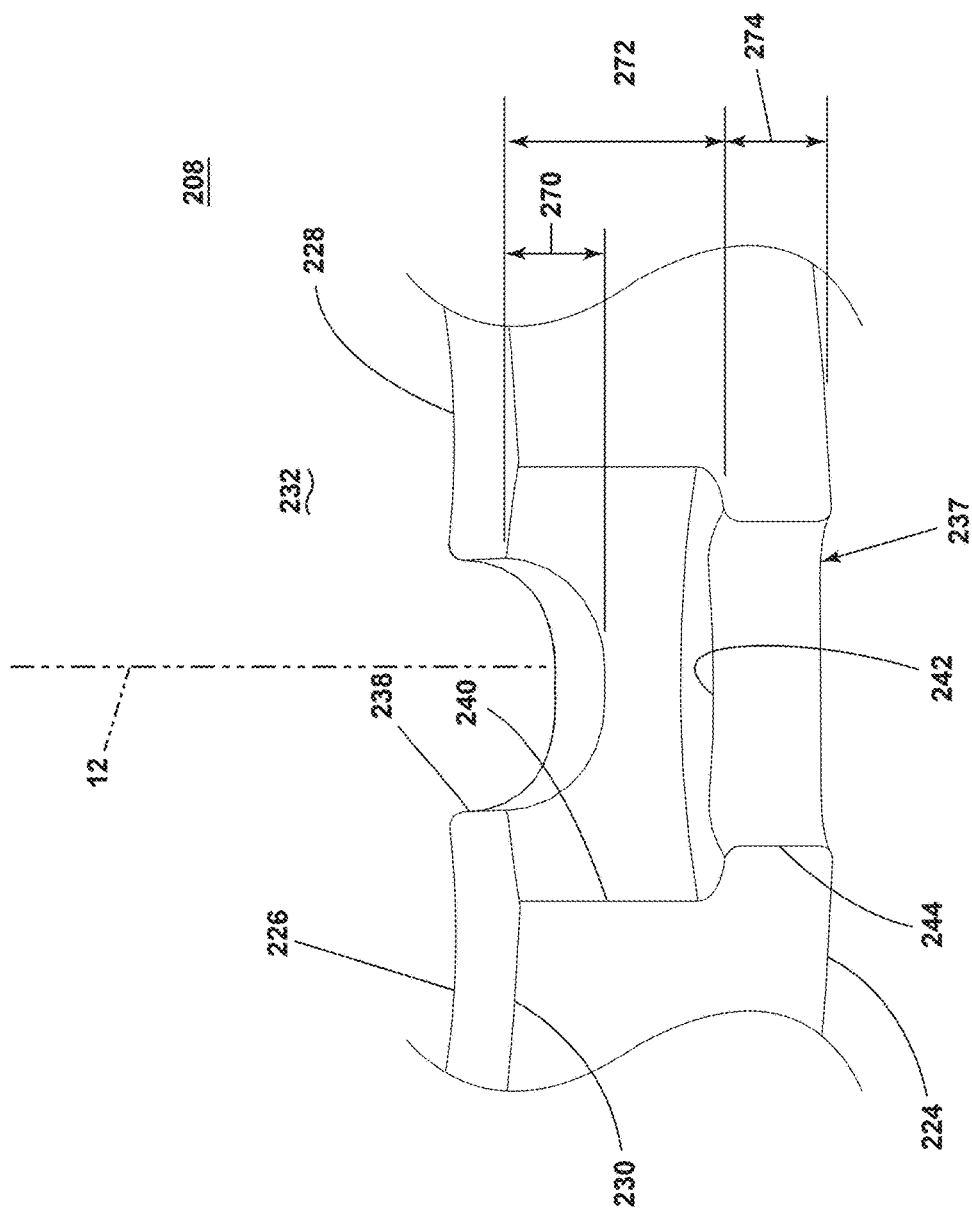
FIG. 7 is a perspective view of a respective fluid passage as seen from section VII of FIG. 4, further illustrating a notch formed along a portion of the fluid passage.

FIG. 7 is a perspective view of a portion of the ring 208 including a respective fluid passage 237 having a first channel 238 of the set of first channels 238, a second channel 240 of the set of second channels 240 and the notch 244 as seen from section VII of FIG. 4.

The first channel 238 extends radially from the inner wall 228 and axially into the second wall 226. The first channel 238 extends axially along a portion of the second wall 226. The first channel 238 extends a first axial distance 270 into the ring 208, with respect to the axis 12.

The second channel 240 extends axially from the second wall 226 and radially into the outer wall 230. The second channel 240 extends axially along a portion of the outer wall 230. The second channel 240 extends a second axial distance 272 along the ring 208, with respect to the axis 12.

The notch 244 extends axially from the distal end 242 of the second channel 240 to the first wall 224 and radially into the outer wall 230. The notch 244 extends axially along a portion of the outer wall 230. The notch 244 extends a third axial distance 274 along the ring 208, with respect to the axis 12.

The second channel 240 axially overlies the first channel 238. In other words, the second axial distance 272 spans an entirety of at least the first axial distance 270. A summation of the second axial distance 272 and the third axial distance 274 equals a total axial thickness of the ring 208 where the first channel 238, the second channel 240, and the notch 244 are located. The second axial distance 272 is larger than or equal to the first axial distance 270. The second axial distance 272 is larger than, smaller than, or equal to the third axial distance 274. The third axial distance 274 is larger than, smaller than, or equal to the first axial distance 270.

Figure 8:
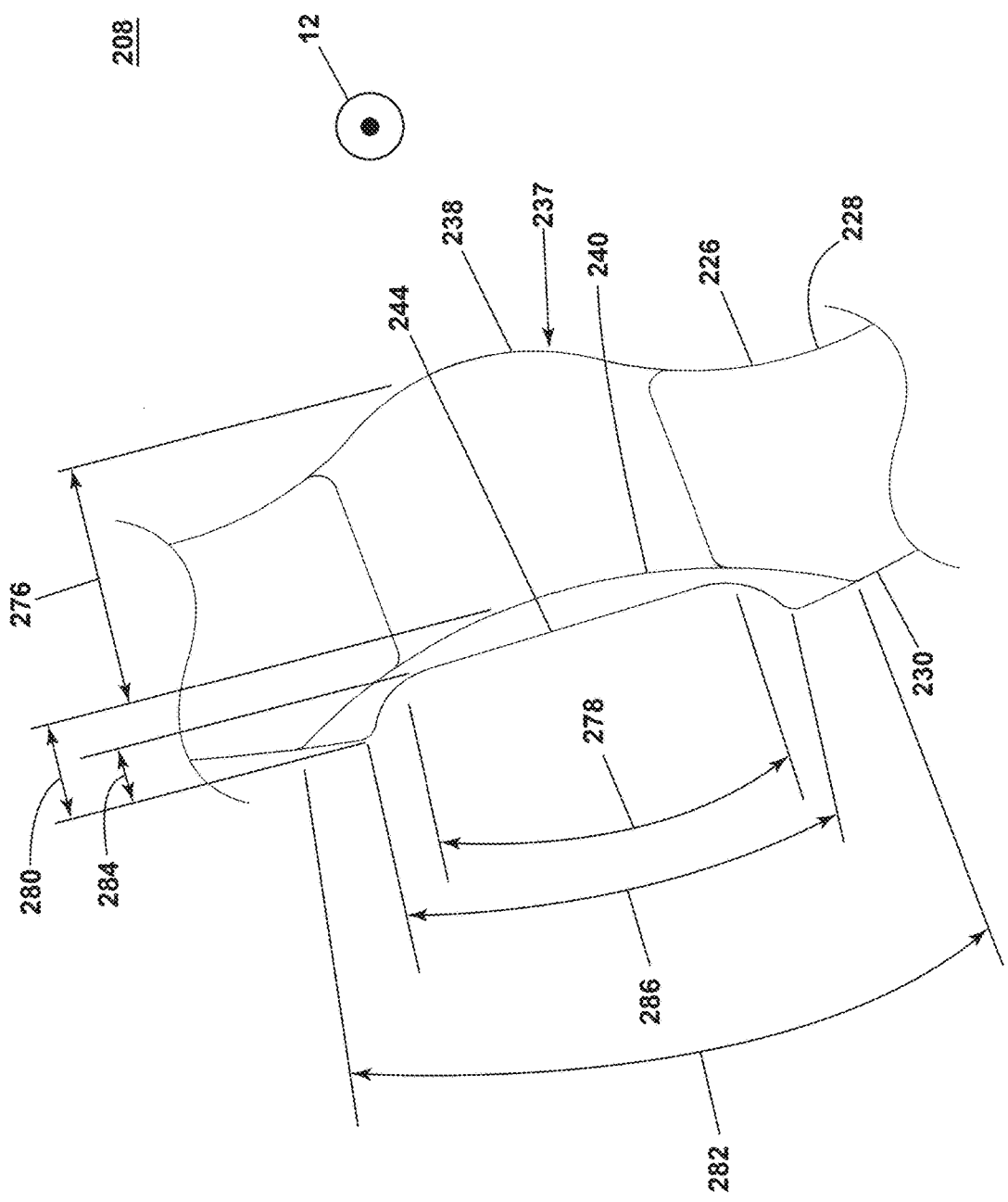
FIG. 8 is a top-down view of the fluid passage of FIG. 7, further illustrating a circumferential and radial extent of the first channel, the second channel and the notch.

FIG. 8 is a top-down view of the portion of the fluid passage 237 of FIG. 7, further illustrating a circumferential and radial extent of the first channel 238, the second channel 240 and the notch 244.

The first channel 238 extends a first radial distance 276 along the second wall 226, with respect to the axis 12. The first channel 238 extends a first circumferential distance 278 along the second wall 226 and the outer wall 230, with respect to the axis 12.

The second channel 240 extends a second radial distance 280 along the second wall 226 and into the outer wall 230, with respect to the axis 12. The second channel 240 extends a second circumferential distance 282 along the outer wall 230, with respect to the axis 12.

The notch 244 extends a third radial distance 284 along the second wall 226 and into the outer wall 230, with respect to the axis 12. The notch 244 extends a third circumferential distance 286 along the outer wall 230, with respect to the axis 12.

The second channel 240 circumferentially overlaps the first channel 238. In other words, the second circumferential distance 282 extends circumferentially across, at least, the first circumferential distance 278. As the first channel 238 is both circumferentially and axially overlapped by the second channel 240, it will be appreciated that the second channel 240 overlaps the first channel 238. The second channel 240 extends circumferentially across and circumferentially overlaps the notch 244.

The first radial distance 276 is larger than the second radial distance 280 and the third radial distance 284. The third radial distance 284 is smaller than or equal to the second radial distance 280. The first circumferential distance 278 is smaller than the third circumferential distance 286. The third circumferential distance 286 is smaller than or equal to the second circumferential distance 282.

Figure 9:
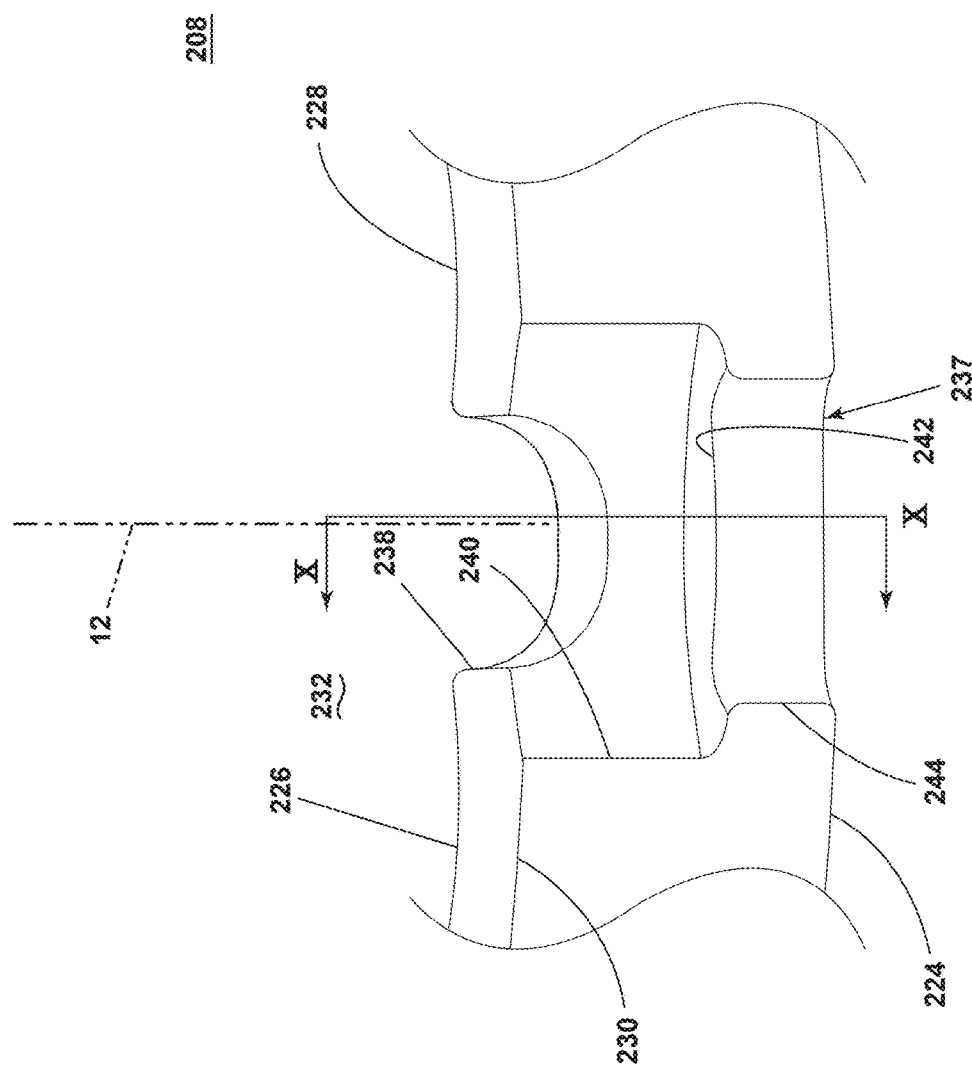
FIG. 9 is a perspective view another fluid passage of the ring as seen from sight line IX-IX of FIG. 4.

FIG. 9 is a perspective view of another fluid passage 237, with respect to the fluid passage of FIG. 7, including a first channel 238 of the set of first channels 238 and a second channel 240 of the set of second channels 240 as seen from sight line IX-IX of FIG. 4. As illustrated, the distal end 242 of the second channel 240 is axially spaced, with respect to the axis 12, from the first wall 224. While not illustrated, it will be appreciated that the first channel 238 includes the first axial distance 270, the first radial distance 276, and the first circumferential distance 278. While not illustrated, it will be appreciated that the second channel 240 includes the second axial distance 272, the second radial distance 280, and the second circumferential distance 282.

Figure 10:
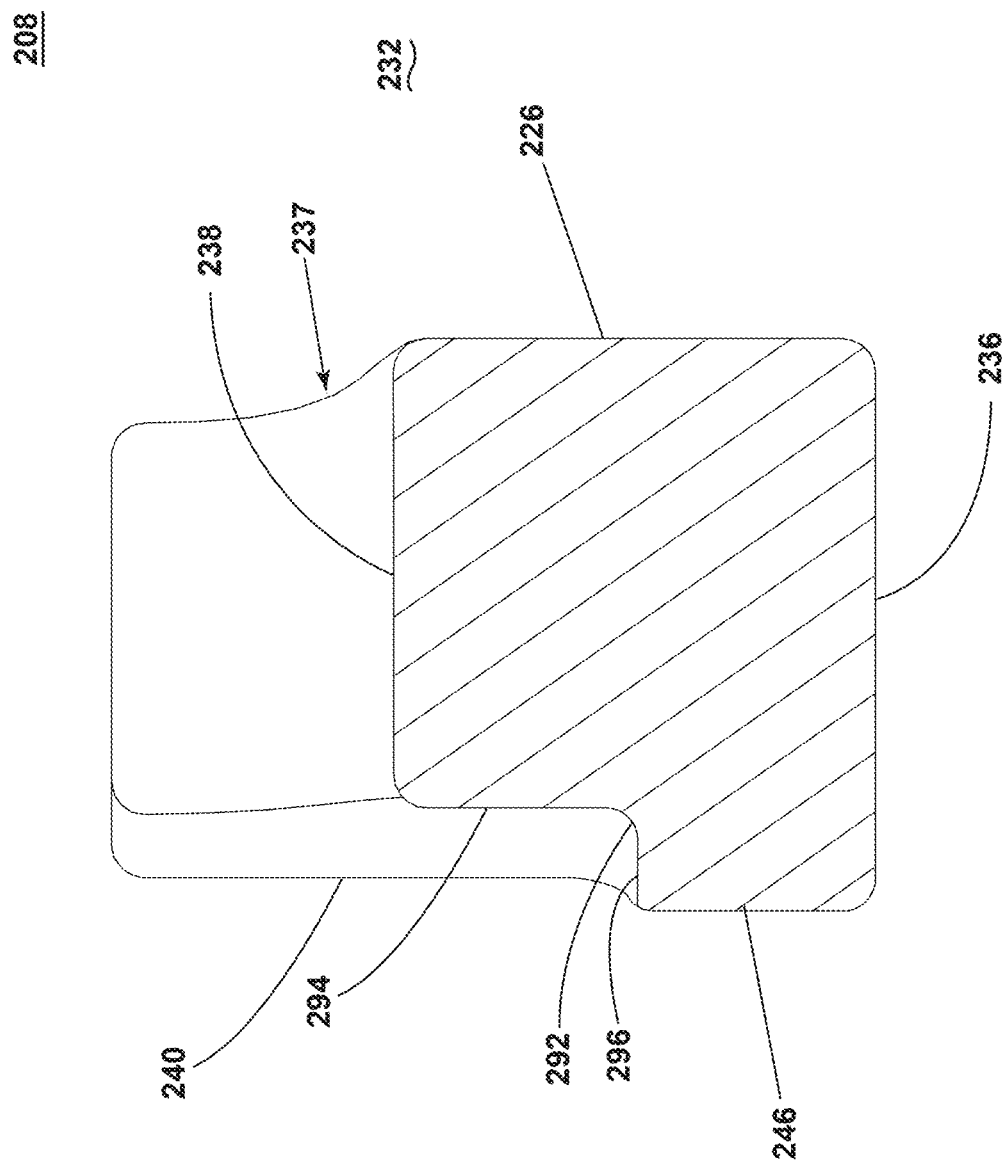
FIG. 10 is a cross-sectional view of the fluid passage as seen from sight-line X-X of FIG. 9, further illustrating a scalloped cross-sectional area of the second channel.

FIG. 10 is a cross-sectional view of the first channel 238 and the second channel 240 as seen from sectional sight-line X-X of FIG. 9. The second channel 240 can include a radiused portion 292, a first linear portion 294 and a second linear portion 296.

The first linear portion 294 extends axially from the first channel 238, with respect to the axis 12. The second linear portion 296 extends radially from the outer wall 230, with respect to the axis 12. The radiused portion 292 is formed therebetween, extending from the first linear portion 294 to the second linear portion 296. It will be appreciated that the radiused portion 292 can be defined by a zero radius. In other words, the first linear portion 294 can extend to the second linear portion 296 and form a right angle therebetween, or another linear portion can interconnect the first linear portion 294 and the second linear portion 296.

The radiused portion 292 allows for a smooth transition between the distal the first linear portion 294 and the second linear portion 296. The smooth transition, in turn, reduces the stress concentration at the transition between the first linear portion 294 and the second linear portion 296. Further, the radiused portion can help in directing a flow of fluid within the second channel 240 during operation of the hydraulic end stop rebound system 200.

Figure 11:
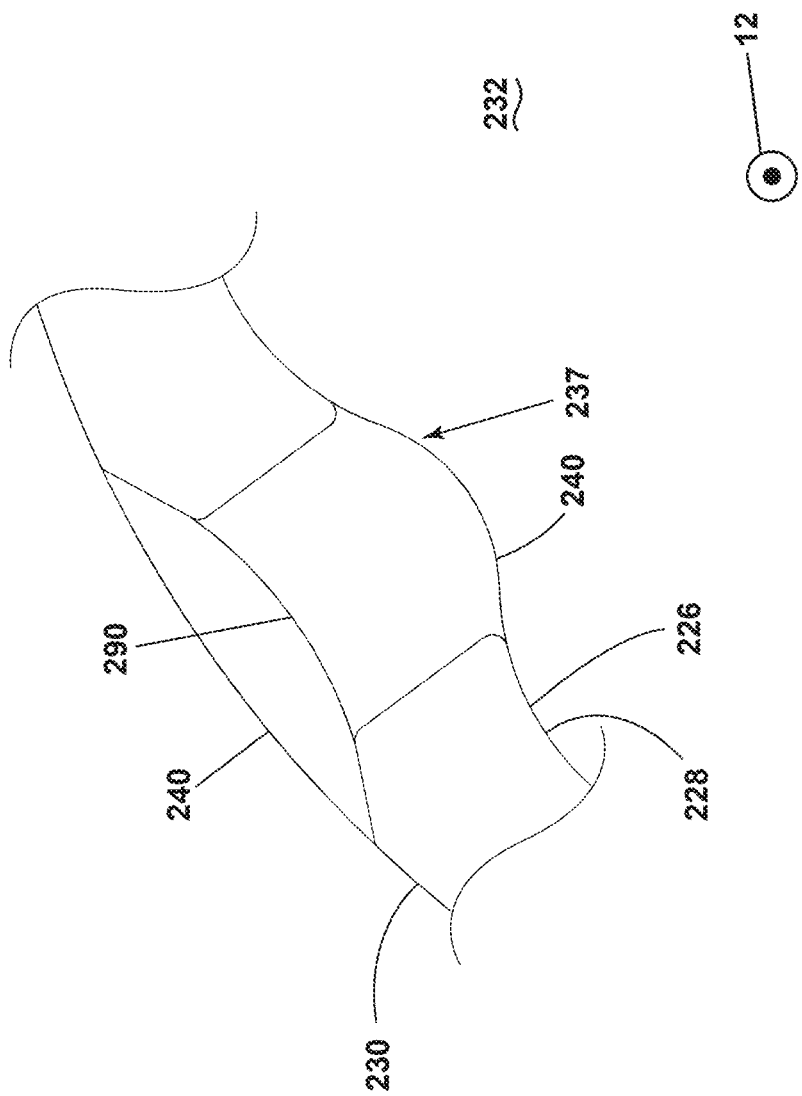
FIG. 11 is s a top-down view of the fluid passage of FIG. 9, further illustrating a cross-sectional area of the second channel.

FIG. 11 is s a top-down view of the fluid passage 237 of FIG. 9. As illustrated, the second channel 240 includes a scalloped cross-sectional area when viewed along a horizontal plane perpendicular to the axis 12 and intersection the second channel 240. As a non-limiting example, the scalloped cross sectional area is defined in part by at least one curved portion 290 extending continuously along the second channel 240.

While illustrated as the second channel 240 including the scalloped cross-sectional area, it will be appreciated that the second channel 240 can have any suitable cross-sectional are when viewed along the horizontal plane. As a non-limiting example, the second channel 240 can have an elliptical, rectangular, triangular, or any other suitable shaped cross-sectional area.

Figure 12:
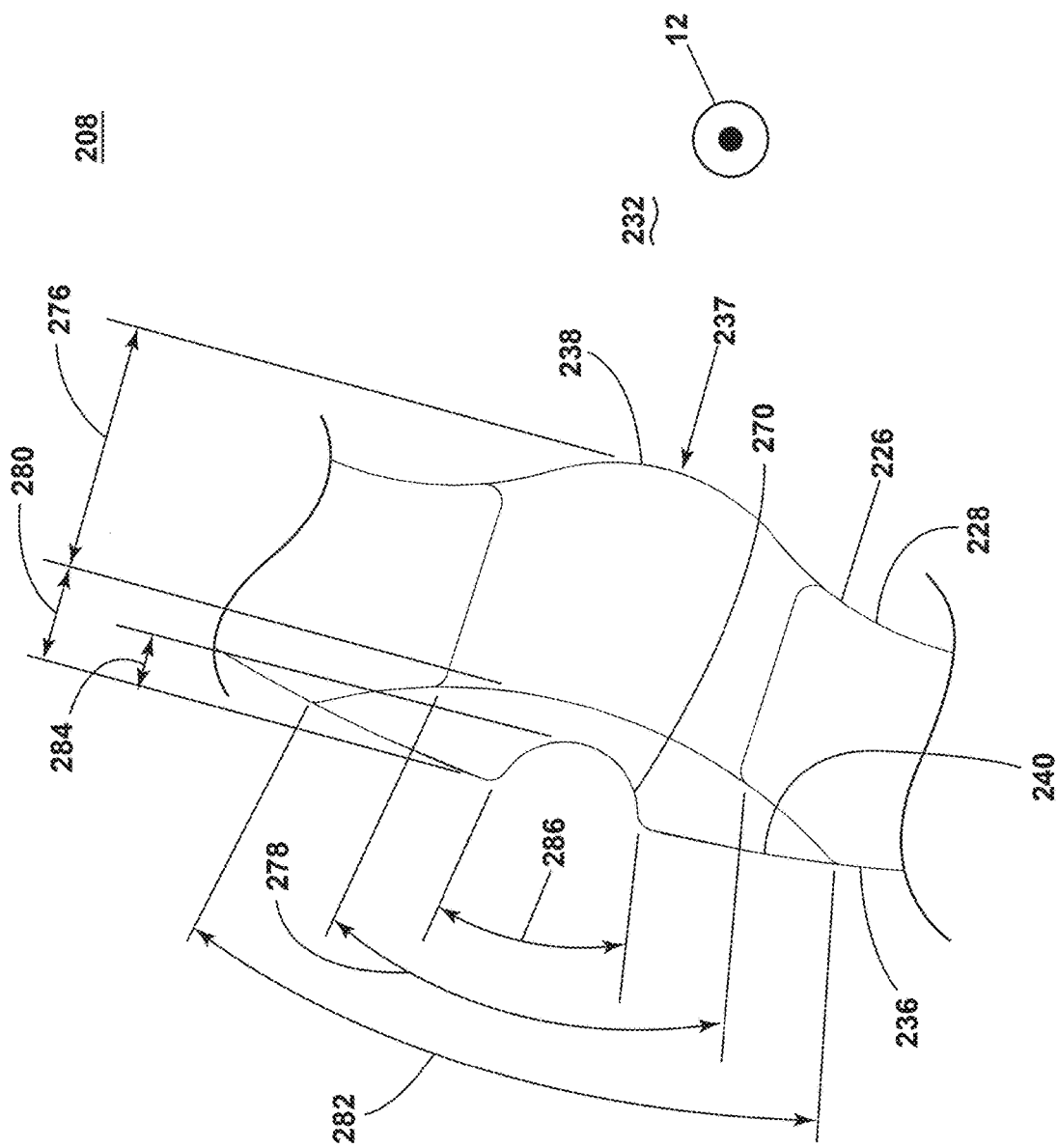
FIG. 12 is a top-down view of another fluid passage of the ring as seen from section XII of FIG. 6, further illustrating the circumferential and radial extent of the notch.

FIG. 12 is a top-down view of another fluid passage 237, with respect to the fluid passage 237 of FIG. 7 and the fluid passage 237 of FIG. 9, including a first channel 238 of the set of first channels 238, a second channel 240 of the set of second channels 240, and a respective notch 244 as seen from section XII of FIG. 6.

The first channel 238 includes the first radial distance 276, and the first circumferential distance 278. The second channel 240 includes the second radial distance 280, and the second circumferential distance 282. The notch 244 includes the third radial distance 284 and the third circumferential distance 286.

The notch 244 is smaller than the notch 244 of FIG. 7. Specifically, the notch 244 has a smaller radial and circumferential extent with respect to the radial and circumferential extent, respectively, of the notch 244 of FIG. 7. The third circumferential distance 286 is smaller than the first circumferential distance 278. The first circumferential distance 278 is smaller than or equal to the second circumferential distance 282.

Figure 13:
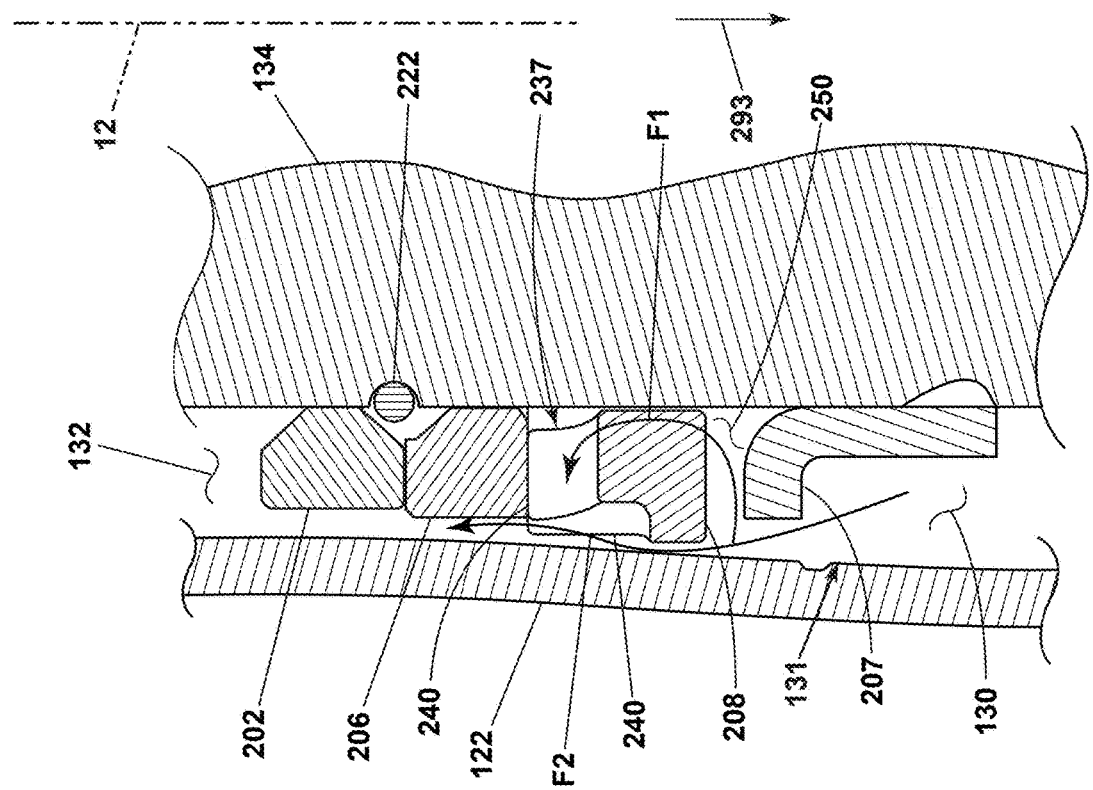
FIG. 13 is an enlarged, cross-sectional view of the sealing assembly as seen from portion XIII of FIG. 6, further illustrating a fluid flow during a compression stroke of the hydraulic damper.
Figure 14:
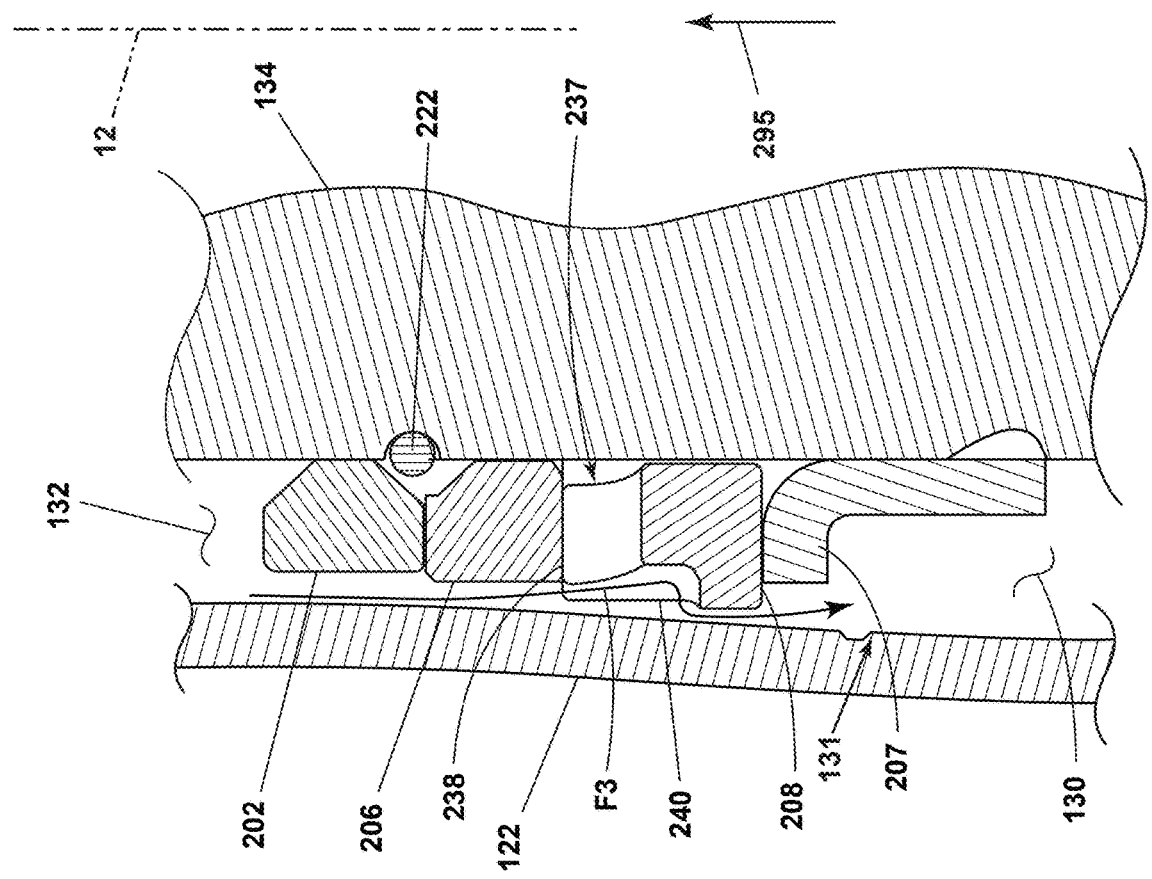
FIG. 14 is an enlarged, cross-sectional view of the sealing assembly as seen from portion XIII of FIG. 6, further illustrating a fluid flow during a rebound stroke of the hydraulic damper.

Referring to FIGS. 13-14, both FIG. 13 and FIG. 14 illustrate an enlarged section of the hydraulic end stop system 200 as seen from section III of FIG. 2. FIG. 13 is the hydraulic end stop system 200 during a compression stroke, while FIG. 14 is the hydraulic end stop system during a rebound stroke. As used herein, the term "rebound stroke" and "compression stroke" can be defined by the direction of movement of the piston rod 134. During the compression stroke, the piston rod 134 moves along the axis 12 in a first direction indicated by a first arrow 293. During the rebound stroke, the piston rod 134 moves along the axis 12 in a second direction, opposing the first direction, indicated by a second arrow 295.

During the compression stroke, fluid flows from the first rebound chamber 130 and into the second rebound chamber 132. It is contemplated that the ring 208 is designed to allow a fluid to flow from the first rebound chamber 130 to the second rebound chamber 132, and vice-versa. It will be appreciated that the first rebound chamber 130 and the second rebound chamber 132 can be defined by their respective pressures in relation to one another. The pressures, however, change based on whether or not it is during the rebound stroke or the compression stroke. For example, during the compression stroke (FIG. 13), the fluid in the first rebound chamber 130 is at a higher pressure than the fluid within the second rebound chamber 132. As more fluid moves into the second rebound chamber 132 and the rebound stroke begins, the pressure in the second rebound chamber 132 is higher than the pressure in the first rebound chamber 130. The pressure of the fluid (e.g., a hydraulic fluid) within the second rebound chamber 132 is higher than the pressure of the fluid within the first rebound chamber 130. This oscillation in pressure via the movement of fluid between first rebound chamber 130 and the second rebound chamber 132 during the compression stroke and the rebound stroke is what gives the hydraulic damper 10 its damping capabilities.

During the compression stroke, a gap 250 is formed between the ring 208 and the second collar 207. As such, the fluid flows from the first rebound chamber 130, into the gap 250 and radially inward towards the piston rod 134, with respect to the axis 12. The fluid can then flow within the opening 232 through the concave surfaces 234 of the ring 208. From the concave surfaces 234, the fluid flows into the first channel 238 and ultimately out of the ring 208 and towards the first rebound chamber 130. As such, the gap 250, the concave surfaces 234 and the first channel 238 defines a first flow path F1 of the fluid from the first rebound chamber 130 to the second rebound chamber 132. At least a portion of the fluid can flow through the second channel 240 and/or the notch 244 if the notch is included within the specific fluid passage 237 (as illustrated, the fluid passage 237 does not include the notch 244). The fluid within the second channel 240 ultimately merges with the first flow path F1 and moves toward the second rebound chamber 132. As such, the second channel 240 and/or the notch 244 collectively define a second flow path F2 of the fluid from the first rebound chamber 130 to the second rebound chamber 132.

The first flow path F1 and the second flow path F2 are defined by the total volume of fluid within the respective flow path. A majority of the fluid will flow along the path of least resistance. It is contemplated that the second channel 240 and/or the notch 244 create a more tortuous pathway for the fluid than the gap 250, the concave surfaces 234, and the first channel 238. As such, the majority of the fluid will flow through the first flow path F1 rather than the second flow path F2.

During the rebound stroke, the fluid from the second rebound chamber 132 flows towards the first rebound chamber 130. The ring 208, however, contacts the second collar 207 such that the gap 250 is closed. As such, the only path for the fluid to flow through is through the second channel 240 and/or the notch 244. The second channel 240 and/or the notch 244 collectively define a third flow path F3 during the rebound stroke.

It is contemplated that the size and makeup of the various portions of the fluid passages 237 can be used to control the flow of fluid during the compression stroke and the rebound stroke. As a non-limiting example, the size of the second channel 240 and the notch 244, along with the total number of notches 244, can be used to raise or lower the pressure of the fluid as it flows through the second flow path F2 and the third flow path F3. As a non-limiting example, a ring 208 with a larger total cross-sectional area of all of the second channels 240 and all of the notches 244, when viewed along a horizontal plane perpendicular to the axis 12 and intersecting the second channels 240 and the notches 244, results in a lower pressure of the fluid flowing through the second flow path F2 and the third flow path F3, when compared to a ring 208 with a smaller total cross-sectional area of the second channels 240 and the notches 244. The variation of the cross-sectional area of the second channels 240 and the notches 244 can be done on a case-by-case basis and be based on the requirements of the hydraulic end stop system 200.

The inclusion of the fluid passages 237, specifically the second channels 240 and the notches 244, result in a more robust ring 208 when compared to a ring 208 that is formed without the notches 244 and the second channels 240. For example, a ring 208 without the notches 244 and the second channels 240, will experience high stresses along the ring 208 during the rebound stroke, as the flow path through the opening 232 of the ring 208 (e.g., the first flow path F1) is closed off, when compared to the ring 208 including the notches 244 and the second channels 240. The ring 208 without the notches 244 and the second channels 240 experiences higher stresses during the rebound stroke, as the fluid flowing from the second rebound chamber 132 is forced to flow around the outer wall of the ring 208 or through small channels formed within the outer wall. These stresses on the ring 208 will ultimately wear on the ring 208 and result in the ring 208 becoming deformed or otherwise breaking. The ring 208 including the second channels 240 and the notches 244, however, experience lower stresses when compared to the ring without the notches 244 and second channels 240 as the inclusion of the notches 244 and the second channels 240 increases the total cross-sectional area that the fluid can flow through when compared to the ring 208 without the notches 244 and second channels 240. This ultimately increases the lifespan, resilience and robustness of the ring 208 including the second channels 240 and the notches 244, when compared to the ring 208 without the second channels 240 and the notches 244.

Figure 15:
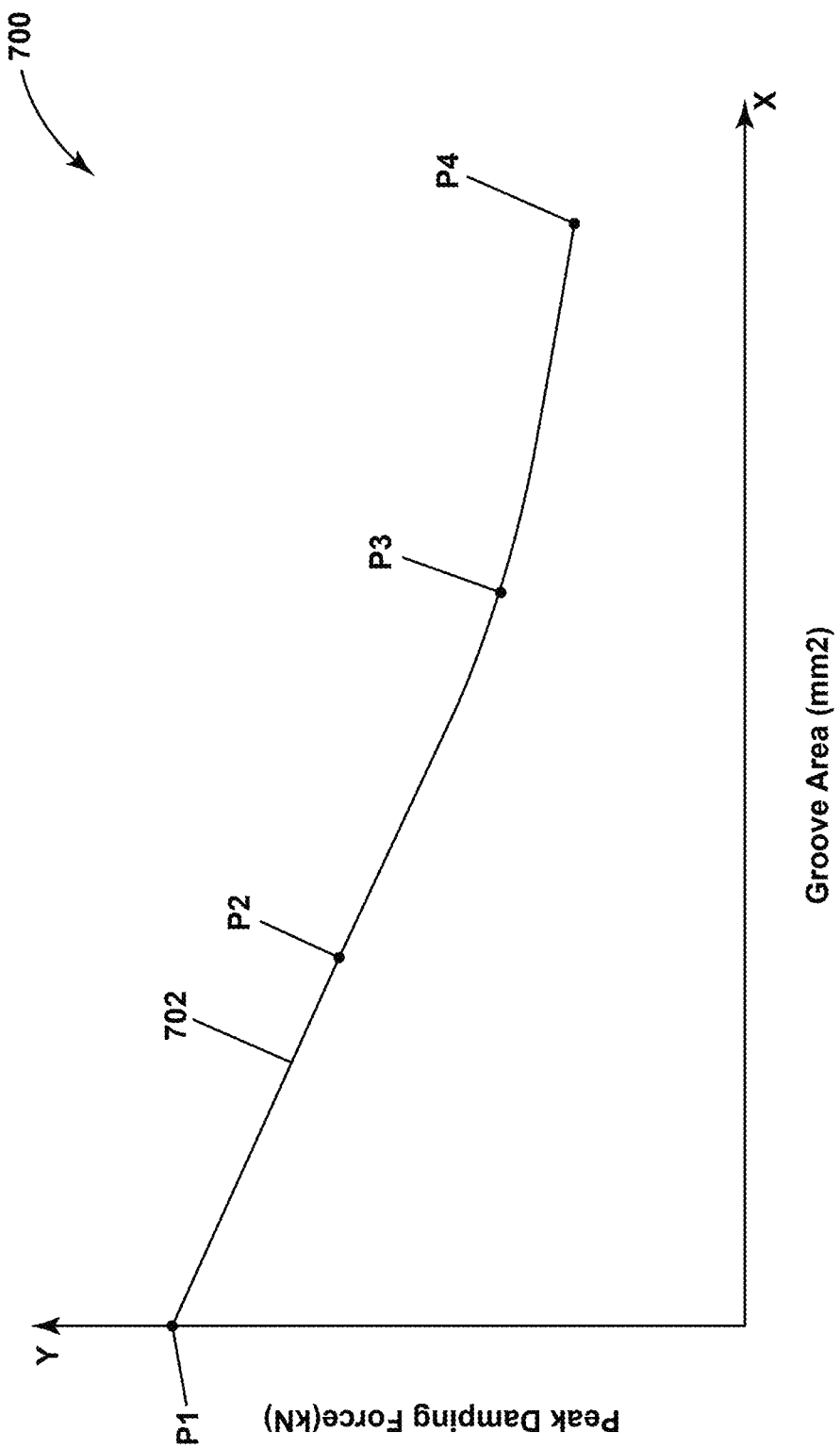
FIG. 15 is a plot illustrating peak damping forces for the ring of FIG. 3 having different cross-sectional areas of the bleed path.
Figure 16:
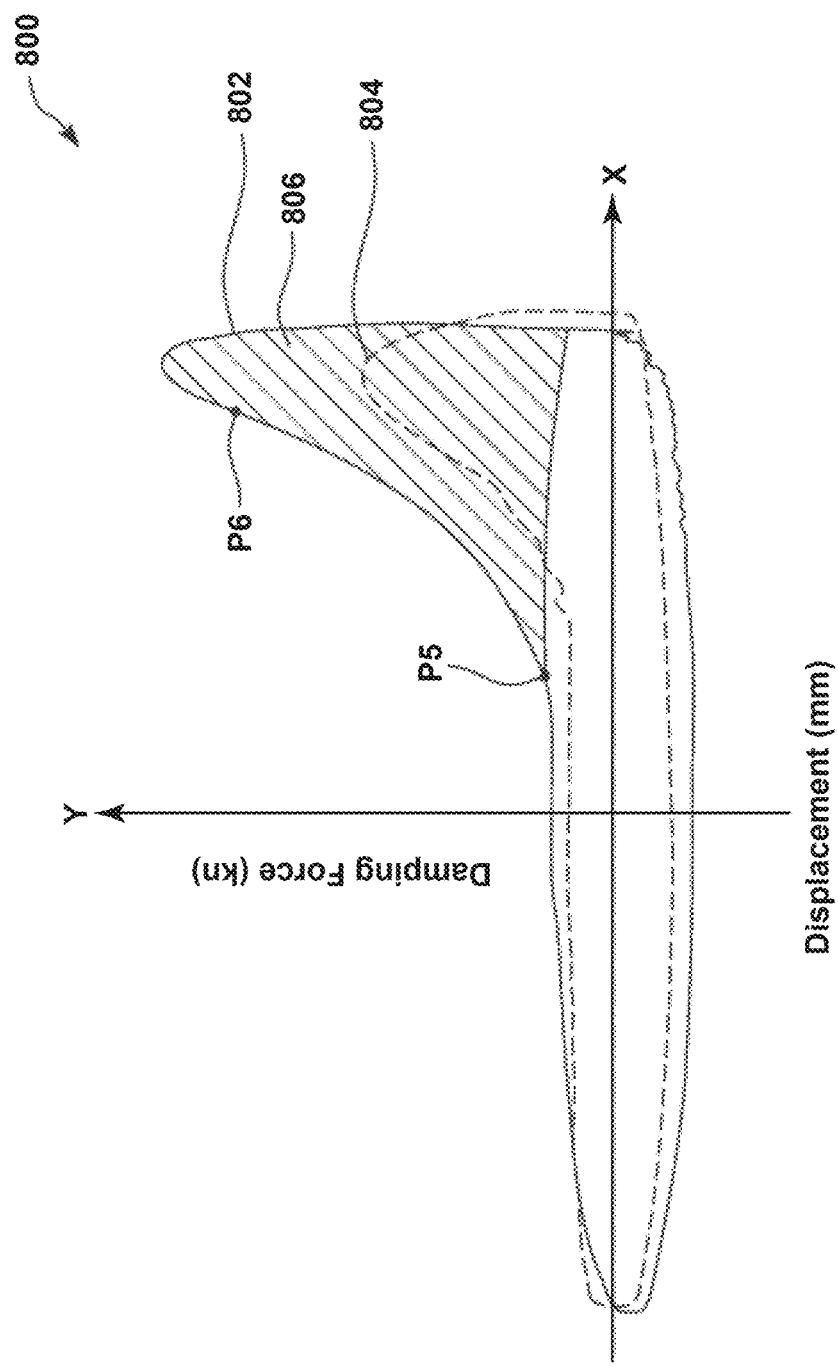
FIG. 16 is an exemplary plot illustrating benchmark comparison between the ring of FIG. 3 and an exemplary ring.

FIG. 15 is a plot 700 illustrating peak rebound damping forces for the ring 208 of FIG. 3 having different cross-sectional areas of the bleed path as discussed herein. Exemplary channel cross-sectional areas (e.g., the fluid passage 237) in terms of square millimeters (mm2) is marked on the X-axis whereas peak damping forces in terms of kilonewton (kN) is marked on the Y-axis. The plot 700 is prepared by plotting results for the different groove areas. More particularly, the pattern 702 is generated by plotting points "P1", "P2", "P3", "P4" corresponding to different channel areas. As illustrated, the point "P1" corresponds to the ring 208 with no fluid passages 237, thus the groove area is zero. Further, the point "P2" corresponds to the ring 208 with a single fluid passage 237, the point "P3" corresponds to the ring 208 with two fluid passages 237, whereas point "P4" corresponds to the ring 208 with three fluid passages 237. It can be concluded that as the fluid passage cross-sectional area and/or number of fluid passages 237 increases, the peak damping force of the hydraulic damper 10 decreases. The number and/or area of the channels may be tuned or adjusted as per application requirements.

FIG. 14 is an exemplary plot 800 illustrating benchmark comparison between the ring 208 of FIG. 3 and an exemplary ring. The plot 800 is generated by moving the piston rod 134 at a desired velocity and displacing the piston rod 134 by a desired displacement beyond a full rebound condition of the hydraulic damper 10. Exemplary displacement of the rings in terms of millimeters (mm) is marked on the X-axis whereas peak damping forces in terms of kilonewton (kN) is marked on the Y-axis.

The plot 800 is prepared by plotting results for two different rings including the ring 208. More particularly, the pattern 802 is generated by plotting points corresponding to the ring 208 shown in FIG. 3 whereas the pattern 804 is generated by plotting points corresponding to a conventional ring. For pattern 802, point "P5" represents a hydraulic rebound end stop initial rate whereas point "P6" represents a hydraulic rebound end stop final rate. More particularly, the hydraulic rebound end stop initial rate and the hydraulic rebound end stop final rate correspond to an initial velocity and a final velocity, respectively, of the piston rod 134 that may be controlled based on the design of the ring 208 in order to achieve desired tunability.

It can be concluded that at similar velocity of the piston rod 134 and similar piston rod displacement, the ring 208 corresponding to the pattern 802 exhibits greater peak damping forces as compared to the ring corresponding to the pattern 804. Further, energy dissipated by the hydraulic damper 10 is represented by an area 806. Accordingly, it can be concluded that the energy dissipated by the hydraulic damper 10 having the ring 208 is greater than energy dissipated by the hydraulic damper 10 having the conventional ring.

Benefits of the present disclosure include a lock for a ring including increased strength when compared to a convention lock for a conventional ring. For example, conventional locks can include a set of confronting elements that circumferentially retain the ring. However, during normal operation of the hydraulic damper including the conventional ring having the conventional lock, the confronting elements tend to fail due to the stresses associated with the ring moving radially inwardly and outwardly with respect to the centerline as the piston rod moves between the rebound and compression strokes. This movement is created by the flow of hydraulic fluid through and around the conventional ring.

Once, however, the conventional lock fails, however, the conventional ring will not operate as intended and subsequently the damping efficiency of the hydraulic damper will be affected and the hydraulic damper will not operate as intended. The hydraulic damper as described herein, however, includes the ring with a lock with increased strength when compared to conventional locks. The lock as described herein, includes the first flange and the second flange, which increase the overall strength of the lock. For example, if the lock did not include either of the first flange or the second flange, the fingers without the flanges would have a decreased resiliency to the expansion and contraction of the ring during normal operation when compared to the ring including the first flange and the second flange. This reduced resiliency, in turn, results in a lock that is more likely to fail (e.g., break) when compared to the lock as described herein. As such, the lock as described herein creates a ring with increased strength and resiliency to the forces associated with normal operation of the hydraulic damper when compared to a conventional ring. This, in turn, means that the ring, and hence the hydraulic damper, will have a longer lifespan and operate as intended over a larger time span when compared to a hydraulic damper including the conventional ring (e.g., a ring without both of the flanges). To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ring circumscribing a moveable rod of a hydraulic damper, the moveable rod defining an axis, the ring comprising:
   a first wall;
   a second wall, axially spaced from the first wall, with respect to the axis;
   an inner wall extending circumferentially about the axis and confronting the moveable rod and extending between the first wall and the second wall;
   an outer wall extending circumferentially about the axis, the outer wall circumscribing the inner wall and extending between the first wall and the second wall; and
   a fluid passage comprising:
      a first channel extending radially along the second wall and from the inner wall, with respect to the axis; and a second channel at least partially overlapping a portion of the first channel and extending axially along a portion of the outer wall and from the second wall, with respect to the axis;
wherein the second channel includes a cross-sectional area when viewed along a vertical plane extending along the axis and intersecting the second channel, the cross-sectional area including a first linear portion, a second linear portion separate from the first linear portion, and a radiused portion provided between and interconnecting the first linear portion and the second linear portion.

2. The ring of claim 1, wherein the second channel includes a cross-sectional area when viewed along a horizontal plane perpendicular to the axis and intersecting the second channel, with the cross-sectional area being one of a rectangular cross-sectional area or scalloped cross-sectional area.

3. The ring of claim 2, wherein the cross-sectional area is a scalloped cross-sectional area and includes a curved portion extending continuously across a circumferential extend of the second channel.

4. The ring of claim 1, wherein the first linear portion extends axially from the first channel, with respect to axis, and the second channel extends radially from the outer wall, with respect to the axis.

5. The ring of claim 1, wherein the first channel extends a first circumferential distance and a first radial distance and the second channel extends a second circumferential distance, larger than the first circumferential distance, and a second radial distance, with respect to the axis.

6. The ring of claim 5, wherein the first radial distance is larger than the second radial distance.

7. A ring circumscribing a moveable rod of a hydraulic damper, the moveable rod defining an axis, the ring comprising:
a first wall;
a second wall, axially spaced from the first wall, with respect to the axis;
an inner wall extending circumferentially about the axis and confronting the moveable rod and extending between the first wall and the second wall;
an outer wall extending circumferentially about the axis, the outer wall circumscribing the inner wall and extending between the first wall and the second wall;
a fluid passage comprising:
a first channel extending radially along the second wall and from the inner wall, with respect to the axis; and
a second channel at least partially overlapping a portion of the first channel and extending axially along a portion of the outer wall and from the second wall, with respect to the axis; and
a notch extending axially through a portion of the outer wall and being directly fluidly coupled to the second channel.

8. The ring of claim 7, wherein:
the first channel extends a first circumferential distance and a first radial distance, with respect to the axis; and
the second channel extends a second circumferential distance and a second radial distance, with respect to the axis; and
the fluid passage further comprises the notch that extends a third circumferential distance and a second third radial distance, with respect to the axis.

9. The ring of claim 8, wherein the second circumferential distance is larger than the first circumferential distance and the third circumferential distance.

10. The ring of claim 8, wherein the first circumferential distance is larger than the third circumferential distance.

11. The ring of claim 8, wherein the first circumferential distance is smaller than the third circumferential distance.

12. The ring of claim 8, wherein the second radial distance and the third radial distance are each smaller than the first radial distance.

13. The ring of claim 12, wherein the third radial distance is smaller than the second radial distance.

14. The ring of claim 12, wherein the third radial distance is equal to the second radial distance.

15. The hydraulic damper of claim 7, wherein the second channel includes a cross-sectional area when viewed along a horizontal plane perpendicular to the axis and intersecting the second channel, with the cross-sectional area being one of a rectangular cross-sectional area or a scalloped cross-sectional area.

16. The hydraulic damper of claim 15, wherein the cross-sectional area is a scalloped cross-sectional area and includes a curved portion extending continuously across a circumferential extend of the second channel.

17. A ring circumscribing a moveable rod of a hydraulic damper, the moveable rod defining an axis, the ring comprising:
a first wall;
a second wall, axially spaced from the first wall, with respect to the axis;
an inner wall extending circumferentially about the axis and confronting the moveable rod and extending between the first wall and the second wall;
an outer wall extending circumferentially about the axis, the outer wall circumscribing the inner wall and extending between the first wall and the second wall; and
a fluid passage comprising:
a first channel extending radially along the second wall and from the inner wall, with respect to the axis; and
a second channel at least partially overlapping a portion of the first channel and extending axially along a portion of the outer wall and from the second wall, with respect to the axis,
wherein the second channel extends between the second wall and a point axially prior the first wall, with respect to the axis.

18. The ring of claim 17, wherein the second channel includes a cross-sectional area when viewed along a horizontal plane perpendicular to the axis and intersecting the second channel, with the cross-sectional area being one of a rectangular cross-sectional area or a scalloped cross-sectional area.

19. The ring of claim 18, wherein the cross-sectional area is a scalloped cross-sectional area and includes a curved portion extending continuously across a circumferential extend of the second channel.

20. The ring of claim 17, wherein:
the first channel extends a first circumferential distance and a first radial distance, with respect to the axis;
the second channel extends a second circumferential distance and a second radial distance, with respect to the axis; and
the second circumferential distance is larger than the first circumferential distance and the first radial distance is larger than the second radial distance.

* * * * *